United States Patent
Hao et al.

(10) Patent No.: US 11,392,440 B2
(45) Date of Patent: Jul. 19, 2022

(54) HARD DISK STATUS MONITORING SYSTEM AND HARD DISK STATUS MONITORING METHOD

(71) Applicant: Fulian Precision Electronics (Tianjin) Co., LTD., Tianjin (CN)

(72) Inventors: Li-Yun Hao, Tianjin (CN); Duo Qiu, Shenzhen (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 554 days.

(21) Appl. No.: 16/412,864

(22) Filed: May 15, 2019

(65) Prior Publication Data

US 2020/0311013 A1 Oct. 1, 2020

(30) Foreign Application Priority Data

Mar. 26, 2019 (CN) .......................... 201910232784.3

(51) Int. Cl.
*G06F 11/07* (2006.01)

(52) U.S. Cl.
CPC ...... *G06F 11/0772* (2013.01); *G06F 11/0706* (2013.01)

(58) Field of Classification Search
CPC ............. G06F 11/0706; G06F 11/0772; G06F 2213/0016

See application file for complete search history.

(56) References Cited

U.S. PATENT DOCUMENTS

| 8,830,611 | B1* | 9/2014 | Chen | G06F 11/325 |
| | | | | 360/31 |
| 9,146,823 | B2* | 9/2015 | Mondal | G06F 11/221 |
| 9,377,967 | B2* | 6/2016 | Dube | G06F 3/0662 |
| 9,921,933 | B2* | 3/2018 | Shih | G06F 11/3034 |
| 2012/0110389 | A1* | 5/2012 | Chen | H04L 43/0817 |
| | | | | 714/47.1 |
| 2012/0133520 | A1* | 5/2012 | Chang | G06F 13/409 |
| | | | | 710/110 |
| 2019/0026179 | A1* | 1/2019 | Araki | G06F 11/142 |

* cited by examiner

*Primary Examiner* — Joseph R Kudirka
(74) *Attorney, Agent, or Firm* — ScienBiziP, P.C.

(57) ABSTRACT

A hard disk status monitoring system for monitoring an operating status of at least one hard disk in real time includes a control unit, a complex programmable logic device, a baseboard management controller, and a display unit. The control unit is configured to acquire a status from the at least one hard disk and generate a corresponding output signal. The complex programmable logic device is configured to receive the output signal generated by the control unit and analyze the output signal to generate a corresponding status signal. The baseboard management controller is configured to receive the status signal generated by the complex programmable logic device and analyze the status signal to generate a corresponding display signal. The display unit is configured to receive the display signal and display the status information of the corresponding hard disk according to the display signal.

8 Claims, 2 Drawing Sheets

HARD DISK STATUS MONITORING SYSTEM AND HARD DISK STATUS MONITORING METHOD

FIELD

The subject matter herein generally relates to hard disk monitoring technology, and more particularly to a hard disk status monitoring system and method for monitoring an operating status of at least one hard disk.

BACKGROUND

Generally, a status of a hard disk is indicated by light emitting diodes (LEDs) disposed on a back panel of the hard disk. For a multi-hard disk system, such as a drawer type hard disk system, some LEDs are not easy to see. Furthermore, the LEDs occupy space.

BRIEF DESCRIPTION OF THE DRAWINGS

Implementations of the present disclosure will now be described, by way of embodiments, with reference to the attached figures.

DETAILED DESCRIPTION

Figure 1:
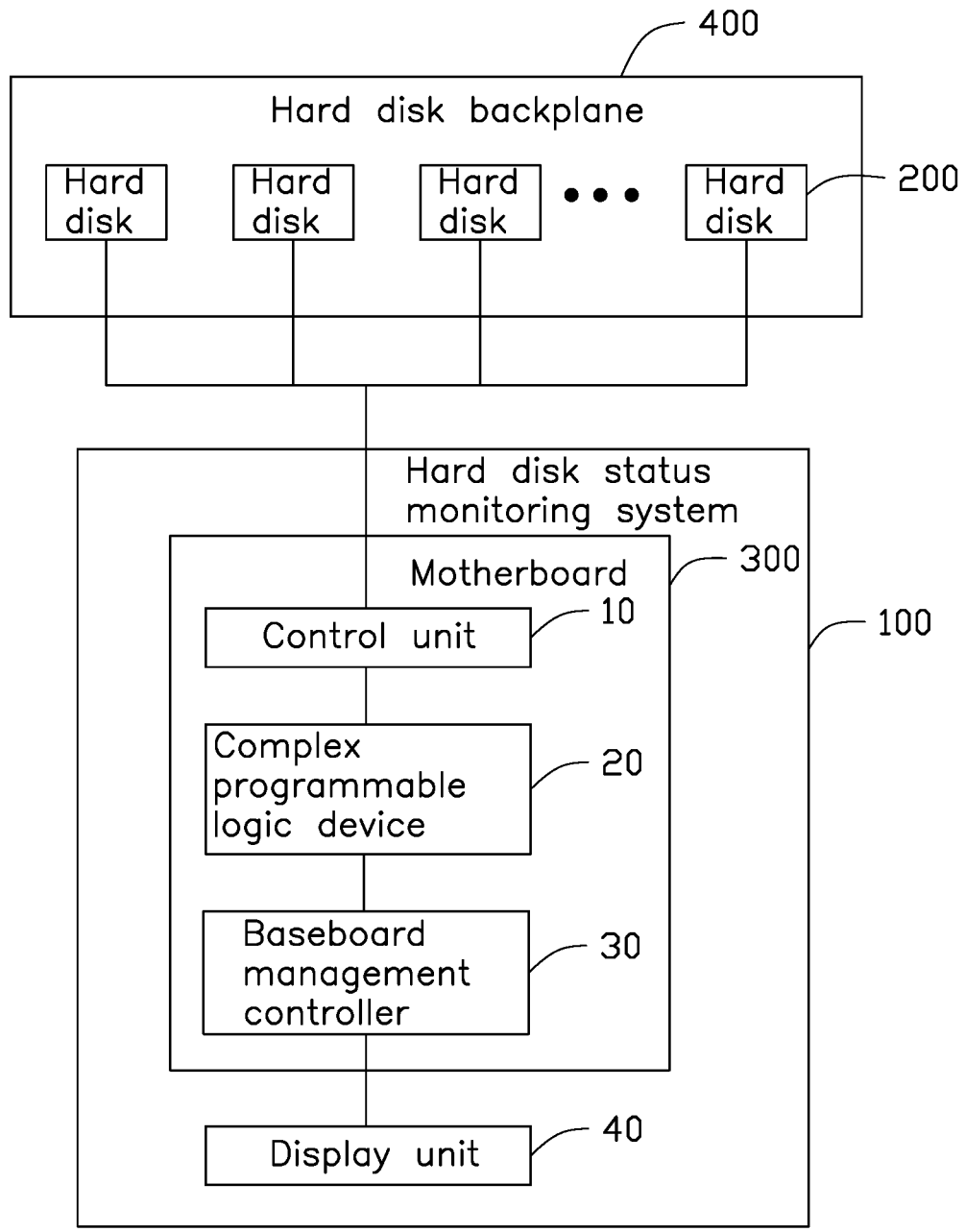
FIG. 1 is a block diagram of an embodiment of a hard disk status monitoring system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 illustrates an embodiment of a hard disk status monitoring system 100. The hard disk status monitoring system 100 is configured to monitor an operating status of at least one hard disk 200 in real time.

The hard disk status monitoring system 100 includes a control unit 10, a complex programmable logic device (CPLD) 20, a baseboard management controller (BMC) 30, and a display unit 40. In one embodiment, the control unit 10, the complex programmable logic device 20, and the baseboard management controller 30 are disposed on a motherboard (MB) 300.

In one embodiment, the at least one hard disk 200 is a hard disk inserted into a hard disk backplane 400 of a drawer type hard disk system. In other embodiments, the hard disk 200 may be a hard disk of other hard disk systems.

The at least one hard disk 200 is communicably coupled to the control unit 10. In one embodiment, the control unit 10 is a serial attached SCSI (SAS) controller card or a platform controller hub (PCH).

The control unit 10 is configured to acquire a status from the at least one hard disk 200 in real time and generate an output signal according to the status of each hard disk 200. The output signal includes a clock signal and a data signal. The data signal includes status information of each hard disk 200. The hard disk status includes an active state, a fault state, a predicated failure analysis (PFA) state, a rebuild state, and a locate state. The status information of the hard disk includes active state information, positioning status information, and fault status information of the at least one hard disk 200. The active state information, the positioning state information, and the fault state information are high level signals or low level signals, such as a level value of 1 or 0. When the active state information is a high level signal, the status of the corresponding hard disk is an active state. When the fault state information is a high level signal and the positioning state information is a low level signal, the status of the corresponding hard disk is a fault state. When the fault state information is a low level signal and the positioning state information is a high level signal, the status of the corresponding hard disk is a positioning state. When the fault state information and the positioning state information are both high level signals, the status of the corresponding hard disk is a rebuild state. When the fault state information alternates between the high level and the low level signals within a period T, the status of the corresponding hard disk is a PFA state. In one embodiment, T is 500 milliseconds (ms).

The complex programmable logic device 20 is communicatively coupled to the control unit 10. The control unit 10 transmits the generated output signal to the complex programmable logic device 20.

In one embodiment, the control unit 10 is communicably coupled to the complex programmable logic device 20 through a serial general purpose input output (SGPIO) bus. The output signal conforms to an SGPIO protocol, the output signal is an SGPIO signal, the clock signal is an SClock signal of the SGPIO signal, and the data signal is an SLoad signal and an SDataOut signal of the SGPIO signal.

In particular, the control unit 10 issues the data signal on the rising edge of the clock signal, and the complex programmable logic device 20 receives the data signal on the falling edge of the clock signal. Therefore, a stability of a level change of the clock signal can determine a validity of the data signal received by the complex programmable logic device 20.

The complex programmable logic device 20 is configured to determine whether the level change of the clock signal is stable, and analyze the output signal according to the determination result.

The baseboard management controller 30 is communicatively coupled to the complex programmable logic device 20. When the level change of the clock signal is stable, the complex programmable logic device 20 analyzes the output signal, generates a status signal according to the analysis result, and transmits the status signal to the baseboard management controller 30. The status signal includes a clock signal and a data signal, and the data signal includes status information of each hard disk.

In one embodiment, the complex programmable logic device 20 is communicatively coupled to the baseboard management controller 30 via an Inter-Integrated Circuit (I2C) bus. The status signal conforms to the I2C protocol. The status signal is an I2C signal, the clock signal is a serial clock (SCL) signal of the I2C signal, and the data signal is a serial data (SDA) signal of the I2C signal.

The display unit 40 is communicatively coupled to the baseboard management controller 30. The baseboard management controller 30 receives the status signal, decodes the status signal, and generates a display signal corresponding to a decoding result and transmits the display signal to the display unit 40. The display unit 40 is configured to receive a display signal and display status information of the corresponding hard disk 200 to facilitate viewing the status of each hard disk 200. The display signal includes a status information table of each hard disk 200 and a corresponding SGPIO signal table. In one embodiment, the display unit 40 is a display screen including a graphical user interface (GUI).

Figure 2:
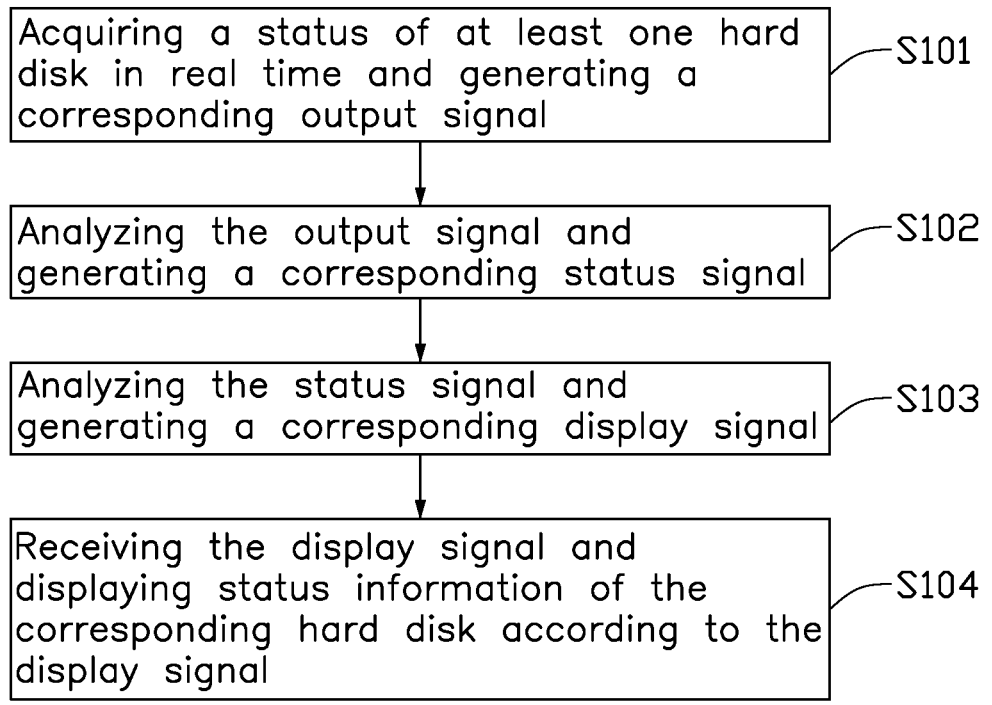
FIG. 2 is a flowchart of a hard disk status monitoring method.

FIG. 2 illustrates a flowchart of a hard disk condition monitoring method for monitoring an operating status of at least one hard disk. The method is provided by way of embodiment, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S101, a status of at least one hard disk is acquired in real time, and a corresponding output signal is generated.

In one embodiment, the status of the at least one hard disk is acquired by a control unit, and the control unit generates the corresponding output signal.

At block S102, the output signal is analyzed, and a corresponding status signal is generated.

In one embodiment, a complex programmable logic device receives the output signal generated by the control unit and analyzes the output signal to generate the corresponding status signal.

In one embodiment, the control unit is communicatively coupled to the complex programmable logic device via a serial universal input/output bus, and the output signal is an SGPIO signal conforming to the SGPIO protocol.

At block S103, the status signal is analyzed, and a corresponding display signal is generated.

In one embodiment, a baseboard management controller receives the status signal generated by the complex programmable logic device and analyzes the status signal to generate a corresponding display signal.

In one embodiment, the complex programmable logic device is communicatively coupled to the baseboard management controller via an Inter-Integrated Circuit (I2C) bus. The status signal is an I2C signal conforming to the I2C protocol.

At block S104, the display signal generated by the baseboard management controller is received by a display unit, and the display unit displays the status information of the corresponding hard disk according to the display signal.

In the hard disk status monitoring system 100, a plurality of hard disks 200 are coupled to the same control unit 10. The control unit 10, the complex programmable logic device 20, the baseboard management controller 30, and the display unit 40 are sequentially coupled. The status of each hard disk 200 can be viewed in real time on the graphical user interface of the display unit 40, which is convenient for viewing, and only one complex programmable logic device 20 needs to be installed. The display unit 40 eliminates the need for LEDs on each hard disk 200, thereby reducing the use of pins and cables and a corresponding cost of manufacture and freeing up space.

Furthermore, the status of the hard disks 200 can be interpreted on the graphical user interface of the display unit 40, so that non-professionals can understand the status of the hard disks.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A hard disk status monitoring system for monitoring an operating status of at least one hard disk in real time, the hard disk status monitoring system comprising:

a controller communicatively coupled to the at least one hard disk and being configured to acquire a status from the at least one hard disk and generate a corresponding output signal;

a complex programmable logic device communicatively coupled to the controller and configured to receive the output signal generated by the controller and analyze the output signal to generate a corresponding status signal;

a baseboard management controller communicatively coupled to the complex programmable logic device and configured to receive the status signal generated by the complex programmable logic device and analyze the status signal to generate a corresponding display signal; and a display unit communicatively coupled to the baseboard management controller and configured to receive the display signal and display status information of the corresponding hard disk according to the display signal;

wherein the status information comprises active state information, when the active state information is a high level signal, the status of the corresponding hard disk is an active state; and wherein the complex programmable logic device is communicatively coupled to the baseboard management controller via an Inter-Integrated Circuit (I2C) bus, the status signal is an I2C signal; the status information further comprises positioning status information, and fault status information of the at least one hard disk; the active state information, the positioning state information, and the fault state information are high level signals or low level signals; when the fault state information is a high level signal and the positioning state information is a low level signal, the status of the corresponding hard disk is a fault state; when the fault state information is a low level signal and the positioning state information is a high level signal, the status of the corresponding hard disk is a positioning state; when the fault state information and the positioning state information are both high level signals, the status of the corresponding hard disk is a rebuild state; and when the fault state information alternates between the high level and the low level signals within a period T, the status of the corresponding hard disk is a predicated failure analysis state.

2. The hard disk status monitoring system of claim 1, wherein:
the output signal comprises a clock signal and a data signal; and
the data signal comprises status information of the at least one hard disk.

3. The hard disk status monitoring system of claim 2, wherein:
the controller is communicably coupled to the complex programmable logic device through a serial general purpose input output (SGPIO) bus;
the output signal conforms to an SGPIO protocol; and
the output signal is an SGPIO signal, the clock signal is an SClock signal of the SGPIO signal, and the data signal is an SLoad signal and an SDataOut signal of the SGPIO signal.

4. The hard disk status monitoring system of claim 1, wherein:
T is 500 milliseconds.

5. A hard disk status monitoring method, comprising:
acquiring, by a controller, a status of at least one hard disk in real time, and generating a corresponding output signal;
analyzing, by a complex programmable logic device, the output signal and generating a corresponding status signal;
analyzing, by a baseboard management controller, the status signal and generating a corresponding display signal; and
receiving, by a display unit, the display signal generated by the baseboard management controller and displaying status information of the corresponding hard disk according to the display signal;
wherein the status information comprises active state information, when the active state information is a high level signal, the status of the corresponding hard disk is an active state; and
wherein the complex programmable logic device is communicatively coupled to the baseboard management controller via an Inter-Integrated Circuit (I2C) bus; and the status signal is an I2C signal; the status information further comprises positioning status information, and fault status information of the at least one hard disk; the active state information, the positioning state information, and the fault state information are high level signals or low level signals; when the fault state information is a high level signal and the positioning state information is a low level signal, the status of the corresponding hard disk is a fault state; when the fault state information is a low level signal and the positioning state information is a high level signal, the status of the corresponding hard disk is a positioning state; when the fault state information and the positioning state information are both high level signals, the status of the corresponding hard disk is a rebuild state; and when the fault state information alternates between the high level and the low level signals within a period T, the status of the corresponding hard disk is a predicated failure analysis state.

6. The hard disk status monitoring method of claim 5, wherein:
the output signal comprises a clock signal and a data signal; and
the data signal comprises status information of the at least one hard disk.

7. The hard disk status monitoring method of claim 6, wherein:
the controller is communicably coupled to the complex programmable logic device through a serial general purpose input output (SGPIO) bus;
the output signal conforms to an SGPIO protocol; and
the output signal is an SGPIO signal, the clock signal is an SClock signal of the SGPIO signal, and the data signal is an SLoad signal and an SDataOut signal of the SGPIO signal.

8. The hard disk status monitoring method of claim 5, wherein:
T is 500 milliseconds.

* * * * *